United States Patent
Asai et al.

(10) Patent No.: US 7,784,048 B2
(45) Date of Patent: Aug. 24, 2010

(54) MOBILE COMMUNICATION TERMINAL AND APPLICATION CONTROL METHOD

(75) Inventors: Mao Asai, Kawasaki (JP); Nobuyuki Watanabe, Sayama (JP); Tatsuro Oi, Tokyo (JP); Mitsuyuki Abe, Yokohama (JP)

(73) Assignee: NTT DoCoMo, Inc., Tokyo (JP)

( * ) Notice: Subject to any disclaimer, the term of this patent is extended or adjusted under 35 U.S.C. 154(b) by 950 days.

(21) Appl. No.: 11/150,230

(22) Filed: Jun. 13, 2005

(65) Prior Publication Data

US 2005/0278717 A1    Dec. 15, 2005

(30) Foreign Application Priority Data

Jun. 14, 2004   (JP) .................. P2004-175935

(51) Int. Cl.
G06F 9/445    (2006.01)
G06F 9/44     (2006.01)
G06F 11/30    (2006.01)

(52) U.S. Cl. .................. 717/178; 717/121; 717/173; 713/191

(58) Field of Classification Search .................. 717/173
See application file for complete search history.

(56) References Cited

U.S. PATENT DOCUMENTS

| | | | |
|---|---|---|---|
| 6,023,620 A | 2/2000 | Hansson | |
| 6,449,476 B1 | 9/2002 | Hutchison, IV et al. | |
| 6,470,496 B1 * | 10/2002 | Kato et al. | 717/173 |
| 6,928,468 B2 * | 8/2005 | Leermakers | 709/221 |
| 7,209,813 B2 * | 4/2007 | Namaky | 701/29 |
| 7,232,949 B2 * | 6/2007 | Hruska et al. | 84/610 |
| 7,233,787 B2 * | 6/2007 | Higuchi et al. | 455/414.1 |
| 7,243,242 B2 * | 7/2007 | Moriai | 713/300 |
| 7,248,231 B2 * | 7/2007 | Hurley et al. | 345/2.1 |
| 7,313,529 B2 * | 12/2007 | Thompson | 705/3 |
| 2002/0100036 A1 * | 7/2002 | Moshir et al. | 717/173 |
| 2003/0023815 A1 * | 1/2003 | Yoneyama et al. | 711/133 |
| 2004/0002367 A1 | 1/2004 | Chanut | |
| 2004/0081110 A1 * | 4/2004 | Koskimies | 370/315 |

FOREIGN PATENT DOCUMENTS

JP    2003-244344    8/2003

(Continued)

OTHER PUBLICATIONS

"Mobile Information Device Profile JSR-37", Sun Microsystems, Dec. 2000. Online retrieved at <java.sun.com/products/midp/>, pp. 1-284.*

(Continued)

*Primary Examiner*—Tuan Q Dam
*Assistant Examiner*—Thuy Dao
(74) *Attorney, Agent, or Firm*—Oblon, Spivak, McClelland, Maier & Neustadt, L.L.P.

(57) ABSTRACT

A mobile communication terminal comprises: a download portion which downloads an application program from an outside WWW server, and secures a data region for reference parameters to which the application program refers at the time of execution; a control signal receiving portion which receives a control signal containing the reference parameters to which the application program refers, and a parameter saving portion which saves the reference parameters contained in the control signal to the data region.

7 Claims, 6 Drawing Sheets

FOREIGN PATENT DOCUMENTS

| | | |
|---|---|---|
| JP | 2004-102698 | 4/2004 |
| JP | 2004-133618 | 4/2004 |

OTHER PUBLICATIONS

"ESCORT: a decentralized and localized access control system for mobile wireless access to secured domains", Kong et al., Sep. 2003, pp. 51-60, <http://delivery.acm.org/10.1145/950000/941320/p51-kong.pdf>.*

"Securing the download of radio configuration files for software defined radio devices", Brawerman et al., Oct. 2004, pp. 98-105, <http://delivery.acm.org/10.1145/1030000/1023802/p98-brawerman.pdf>.*

"Component-based interchangeable cryptographic architecture for securing wireless connectivity in Java.TM. applications", Lo et al., Sep. 2003, pp. 301-307, <http://delivery.acm.org/10.1145/960000/954047/p301-lo.pdf>.*

"Verifiable distributed oblivious transfer and mobile agent security", Zhong et al., Sep. 2003, pp. 12-21, <http://delivery.acm.org/10.1145/950000/941082/p12-zhong.pdf>.*

* cited by examiner

MOBILE COMMUNICATION TERMINAL AND APPLICATION CONTROL METHOD

BACKGROUND OF THE INVENTION

1. Field of the Invention

The present invention relates to a mobile communication terminal and an application control method.

2. Related Background of the Invention

It has been common to download to and execute on a mobile communication terminal such as a cellular phone an application program, which is used in a game, electronic commerce and the like. As a technology of controlling such an application program from a remote server or the like, there is, for example, mobile equipment described in Japanese Patent Application Laid-Open No. 2003-244344. In this mobile equipment, a control signal containing unusable information and the like is received from a service delivery system, whereby control is performed such that an application program is made unusable.

SUMMARY OF THE INVENION

Among such application programs, there are application programs that perform operation while receiving parameters such as character data, voice data, image data, and the like from a remote server. For example, display and reproduction of a news item in an application program for providing news, and display and the like of advertising information in an application program for advertisement display fall under the above operation. If these parameters can be transmitted as the abovementioned control signals, operation of the application programs can be controlled effectively.

However, of all the control information, parameters such as character data and the like contain relatively large amount of data, so it is difficult to always secure data capacity for the parameters in a limited data resource of a mobile communication terminal.

The present invention is, therefore, contrived in view of the above problem, and an object of the present invention is to prevent an application program from not being able to be executed due to insufficient memory, and to smoothly control the application program.

A mobile communication terminal of the present invention comprises downloading means for downloading an application program from outside and securing a data region for reference parameters to which the application program refers at the time of execution, control signal receiving means for receiving a control signal which contains the reference parameters to which the application program refers, and parameter saving means for saving to the data region the reference parameters contained in the control signal.

Alternatively, an application control method of the present invention is to control an application program inside a mobile communication terminal from a remote control device, and comprises the steps of securing a data region in which, when downloading an application program from outside, the mobile communication terminal secures a data region for reference parameters to which the application program refers at the time of execution, transmitting a control signal in which the control device transmits, to the mobile communication terminal, a control signal containing the reference parameters to which the application program refers, saving parameters in which the mobile communication terminal saves the reference parameters contained in the control signal to the data region, and reading parameters in which the application program in the mobile communication terminal reads out the reference parameters from the data region during execution.

In such a mobile communication terminal and an application control method, after a data region for storing reference parameters are secured when an application program is downloaded by the mobile communication terminal, a control signal is transmitted from a remote control device to the mobile communication terminal. After the reference parameters contained in the control signal are saved to the data region by means of the mobile communication terminal, the reference parameters are read out by the application program. Accordingly, parameters for operation control can be securely delivered to the application program on the mobile communication terminal from the remote control device.

Moreover, it is preferred that the control signal receiving means notify the application program of that the reference parameters are received.

In this case, the application program can have a configuration in which the notification of receiving the reference parameters is taken as an opportunity to read out the reference parameters. Therefore, operation of the application program can be controlled immediately in a timely fashion for an update of the parameters. Further, the functional configuration of the application program can be more simplified compared to, for example, a case in which the application program actively reads out parameters.

DESCRIPTION OF THE PREFERRED EMBODIMENTS

Preferred embodiments of the mobile communication terminal of the present invention will now be described in detail along with the figures hereinbelow. It should be noted that like reference characters are used to indicate the same elements, thus the overlapping explanations are omitted accordingly.

Figure 1:
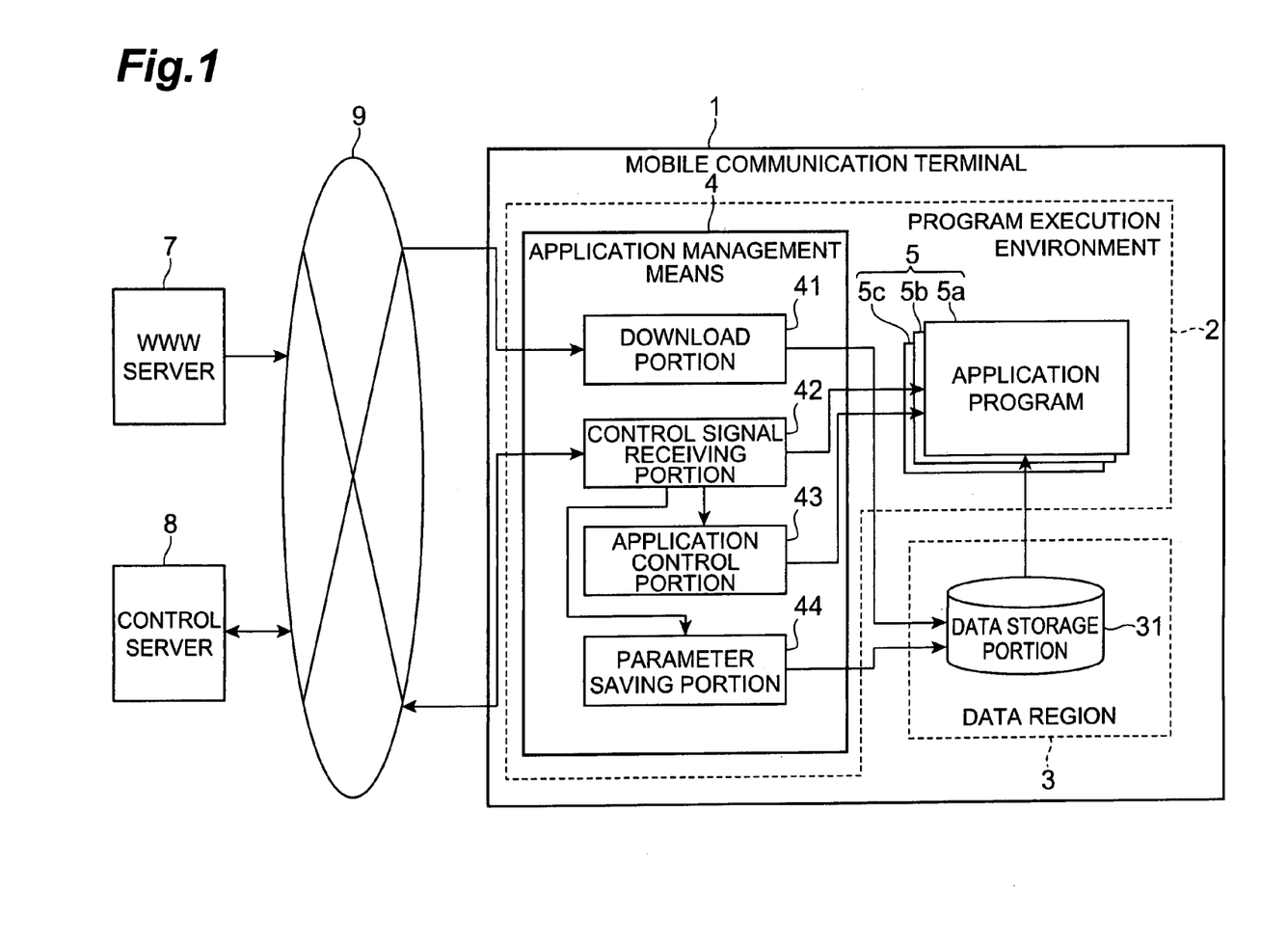
FIG. 1 is a general configuration diagram showing a preferred embodiment of the mobile communication terminal according to the present invention.

FIG. 1 is a general configuration diagram showing a preferred embodiment of the mobile communication terminal according to the present invention. A mobile communication terminal 1 shown in the figure is a communication terminal having an environment which can operate an application program for realizing a standby image display function, a game function, a news display function and the like. Examples of such communication terminal include pieces of equipment such as a cellular phone, PHS (Personal Handyphone System), and PDA (Personal Digital Assistance) with which information communication can be performed through a network. As shown in FIG. 1, the mobile communication terminal 1 is comprises a program execution environment 2 and a data region 3 as functional components.

The program execution environment 2 is configured on hardware such as a CPU (Central Processing Unit), RAM (Random Access Memory) and the like, and is an operation environment in which is resident a system program such as an OS (Operating System) which performs management of a file, memory, and data input/output, provision of a user interface, and the like. Moreover, in the program execution environment 2, there is executed a base program for realizing functions such as a communication function, an e-mail transmission function, and an Internet connection function, which are basic functions of the mobile communication terminal 1.

The data region 3 is constructed on a memory such as a. RAM (Random Access Memory), ROM (Read Only Memory), and a magnetic disk, and stores system data used by a system program such as an OS, baseline data such as phonebook data used by the base program, various program files, and data which is referred to by application programs when executing the application programs.

Further, a JAVA(registered trademark) virtual machine program (not shown), which is used to execute an application program written in a JAVA(registered trademark) language, is resident in the program execution environment 2. In order to execute the application program written in a JAVA(registered trademark) language on the mobile communication terminal 1, the JAVA(registered trademark) virtual machine program converts the above language into a code which can be comprehended in the program execution environment 2, and delivers the code to the program execution environment 2.

Hereinafter, "application program" means a program other than the system program or base program, and indicates a program which is downloaded from outside a WWW server or the like and then executed. Examples of such an application program include a program which displays an image at the time of call standby, a program which provides a game function, a program which displays news, and the like. Among application programs, there is a so-called parameter reference type application, which, as with a program displaying news, operates while referring to the reference parameters of character data, voice data, image data and the like stored in a data storage portion 31.

In the mobile communication terminal 1, application programs 5a, 5b and 5c can be executed in the program execution environment 2 by the function of the JAVA(registered trademark) virtual machine program. The application programs 5a, 5b and 5c are downloaded from a WWW (World Wide Web) server 7 through a network 9 which is configured by a cellular communication network and the Internet (the details are described hereinbelow). A program code for each of the application programs 5a, 5b and 5c is stored in the data storage portion 31 in the data region 3 by the download, and is read out from the data storage portion 31 into the program execution environment 2 on start-up.

Furthermore, application management means 4 for controlling execution of the application programs 5a, 5b and 5c is mounted in the program execution environment 2. The application management means 4 is configured so as to be able to perform data transmission with the WWW server 7 and a control server 8 by means of a HTTP (Hyper Text Transfer Protocol) communication protocol through the network 9. It should be noted that the control server 8 is a server which remotely controls operation of the application programs 5a, 5b and 5c that are executed on the mobile communication terminal 1.

The application management means 4 performs activation control and communication control of the application programs 5a, 5b and 5c. In addition, the application management means 4 has a download function of downloading program codes for the application programs 5a, 5b and 5c from the WWW server 7, and a relay function of relaying the remote control of the application programs 5 which is performed by the control server 8.

The application management means 4 comprises, as functional components, a download portion (downloading means) 41, control signal receiving portion (control signal receiving means) 42, application control portion 43, and parameter saving portion (parameter saving means) 44. Each of the components is described hereinbelow.

The download portion 41 is a portion which downloads the program cods for the application programs 5a, 5b and 5c from the WWW server 7, which is external equipment. Specifically, the download portion 41 first acquires an ADF (Application Descriptor File) file in repose to a download request sent from a Web browser or the like by a user. The ADF file is a file in which is described the information on an application program to be downloaded, such as, for example, a storage location of an application program inside the WWW server 7, the size, name or the like of the application program. The download portion 41 then refers to the detail of this ADF file and judges whether it is possible to download, and thereafter downloads program codes for the application programs 5a, 5b and 5c from the WWW server 7.

Further, the download portion 41 associates the acquisition location URLs (Uniform Resource Locator) of the ADF files, which correspond to the downloaded application programs 5a, 5b and 5c, with the application programs 5a, 5b and 5c, and stores the URLs in a data region within the data region 3. The acquisition location URL of the ADF file is the information that the application management means 4 uses to uniquely identify the application programs 5a, 5b and 5c.

Moreover, at the time of downloading, in the case where the application programs 5a, 5b and 5c, which are the download targets, are parameter reference type, the download portion 41 secures a fixed volume of data region for reference parameters (reference parameter data region) in the data storage portion 31. It should be noted that the reference parameter data region is secured as a data region dedicated to the application programs 5a, 5b and 5c that are the download targets.

The control signal receiving portion 42 is a portion which receives, from the control server 8, a control signal for controlling the application programs Sa, 5b and 5c. It should be noted that a plurality of lines are multiplexed between the mobile communication terminal 1 and the network 9, thus, even if the communication function, e-mail transmission function, and Internet connection function are used in the mobile communication terminal 1, transmission of a signal between the control signal receiving portion 42 and control server 8 can be performed simultaneously.

The control signal contains control at least one of control information which controls operational states of the application programs 5a, 5b and 5c, and the reference parameters to which the application programs 5a, 5b and 5c referred. The control of the operational states of the application program 5a, 5b and 5c is not limited to stoppage, restart, execution of a predetermined processing, and the like of the application programs executed in the program execution environment 2, and includes control such as changing to a state where the application programs 5a, 5b and 5c (including inactivated programs) which are being downloaded to the data storage portion 31 can be activated or cannot be activated. Further, the control signal includes an acquisition location URL of the ADF file so as to specify an application program which is a control target.

The control information is set to "stop" when wishing to change the application program into an inactivatable state, and "restart" when wishing to change the application program to an activatable state by the control server 8. For the reference parameters, data such as character information that the user wishes to deliver to the application program, which is a control target, is set by the control server 8.

Further, the control signal receiving portion 42 has a function of notifying the application programs 5*a*, 5*b* and 5*c*, which are the control targets, of that the control signal receiving portion 42 received a control signal containing the reference parameters, if the control signal receiving portion 42 receives a control signal. The application programs, which will be notified, are specified with the acquisition location URLs of the ADF files contained in the control signal. The application programs 5*a*, 5*b* and 5*c* which received the notification read out the reference parameters, which are saved by the process of the after-mentioned parameter saving portion 44, from the data storage portion 31 at the time of execution.

If the control signal receiving portion 42 received a control signal containing the control information, the control signal receiving portion 42 outputs the acquisition location URLs of the ADF files contained and the control information in the control signal to the application control portion 43, and, if the control signal receiving portion 42 received a control signal containing reference parameters, the control signal receiving portion 42 outputs the acquisition location URLs of the ADF files and the reference parameters contained in the control signal to the parameter saving portion 44.

The application control portion 43 is a portion which changes the operational states of the application programs 5*a*, 5*b* and 5*c* based on the acquisition location URLs of the ADF files and the control information which are outputted from the control signal receiving portion 42. In more detail, the application control portion 43 specifies an application program as a control target from the acquisition location URLs of the ADF files, and allows the application program to transit to an activatable/inactivatable state. Methods for transiting to an inactivatable state include a method for rewriting some of the program codes of the control target application programs 5*a*, 5*b* and 5*c*, or deleting or updating the parameters that the application programs 5*a*, 5*b* and 5*c* refer to when being activated. On the other hand, regarding the transition to an inactivatable state, a method for restoring updated or deleted program codes or parameters as described above can be used.

For example, there is a case in which "URL 1" for the acquisition location URL of an ADF file, and "stop" for the control information are outputted from the control signal receiving portion 42, where the acquisition location URL of an ADF file corresponding to the application program 5*a* is "URL 1". In this case, the application control portion 43 allows the operational state of the application program 5*a* to an inactivatable state by rewriting some of the program codes of the application program 5*a*.

Figure 2:
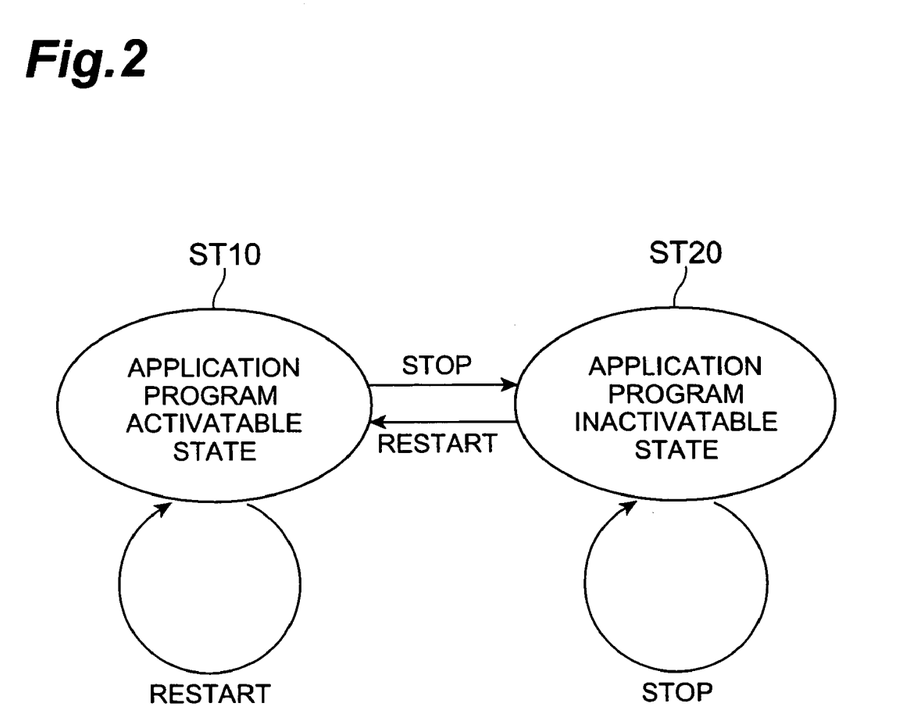
FIG. 2 is a state transition diagram which explains a processing of an application control portion shown in FIG. 1.

FIG. 2 is a state transition diagram which explains a processing of the application control portion 43. As shown in the figure, if control information "stop" is transmitted from the control server 8 when an application program, which is a control target, is in an activatable state ST 10, the application control portion 43 allows the application program to transit to an inactivatable state ST 20. If control information "restart" is transmitted from the control server 8 in the same situation as above, the application control portion 43 allows the application program to remain in the activatable state. On the other hand, if the control information "restart" is transmitted from the control server 8 when the control target application program is in the inactivatable state ST 20, the application control portion 43 allows the application program to transit to the activatable state ST 10. if the control information "stop" is transmitted from the control server 8, the application control portion 43 allows the application program to remain in the inactivatable state. In this manner, the operational state of the application program is controlled.

Back to FIG. 1, the parameter saving portion 44 is a portion which uses the acquisition location URL of the ADF file and the reference parameters which are outputted from the control signal receiving portion 42 as the reference parameters for an application program corresponding to the acquisition location URL of an ADF file, to save to the data storage portion 31. It should be noted that the reference parameters are saved to the reference parameter region, which is secured by the downloading portion 41, when downloading an application corresponding to the acquisition location URL of an ADF file.

Figure 3:
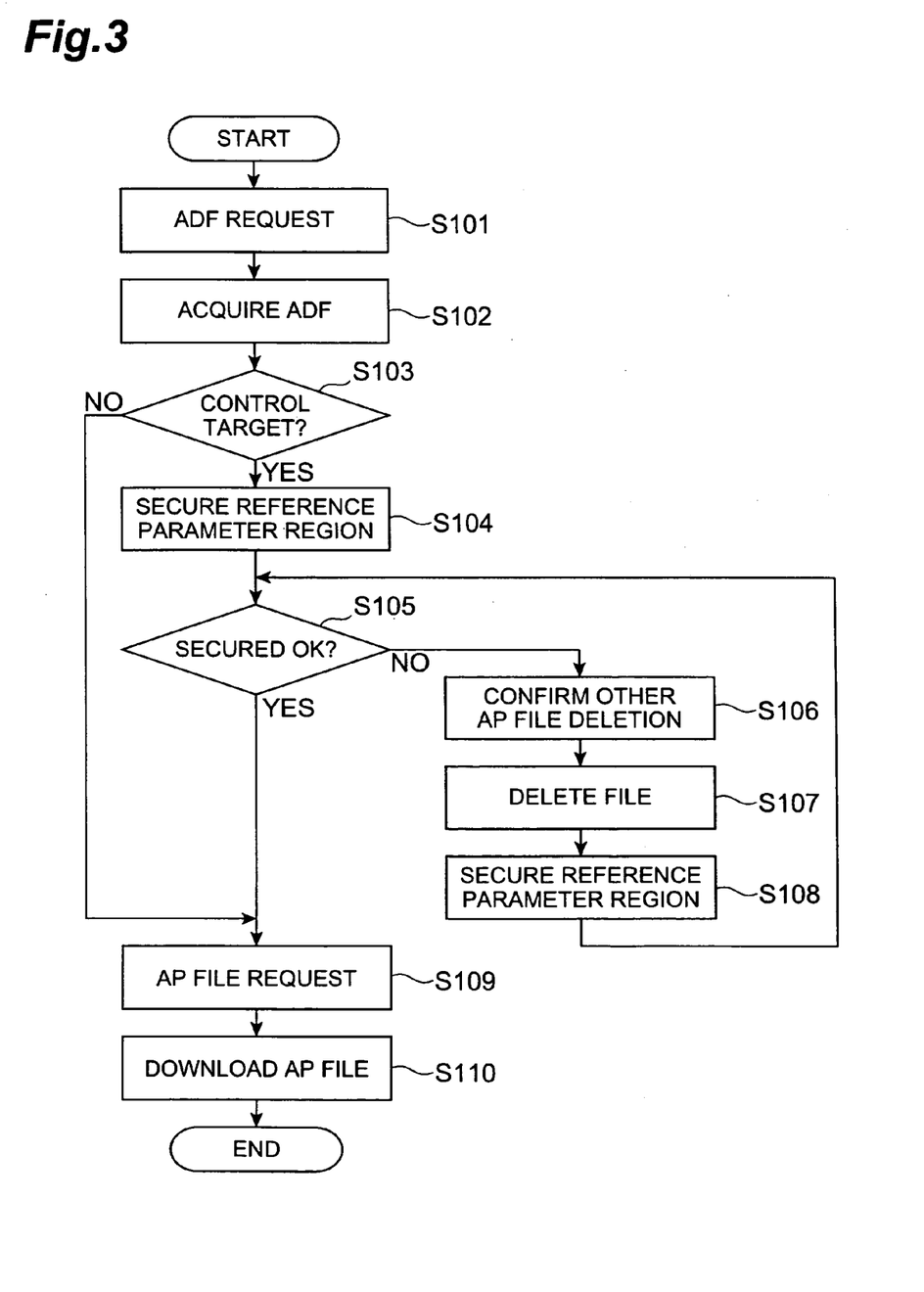
FIG. 3 is a flow chart showing operation of the mobile communication terminal at the time of downloading an application program.
Figure 4:
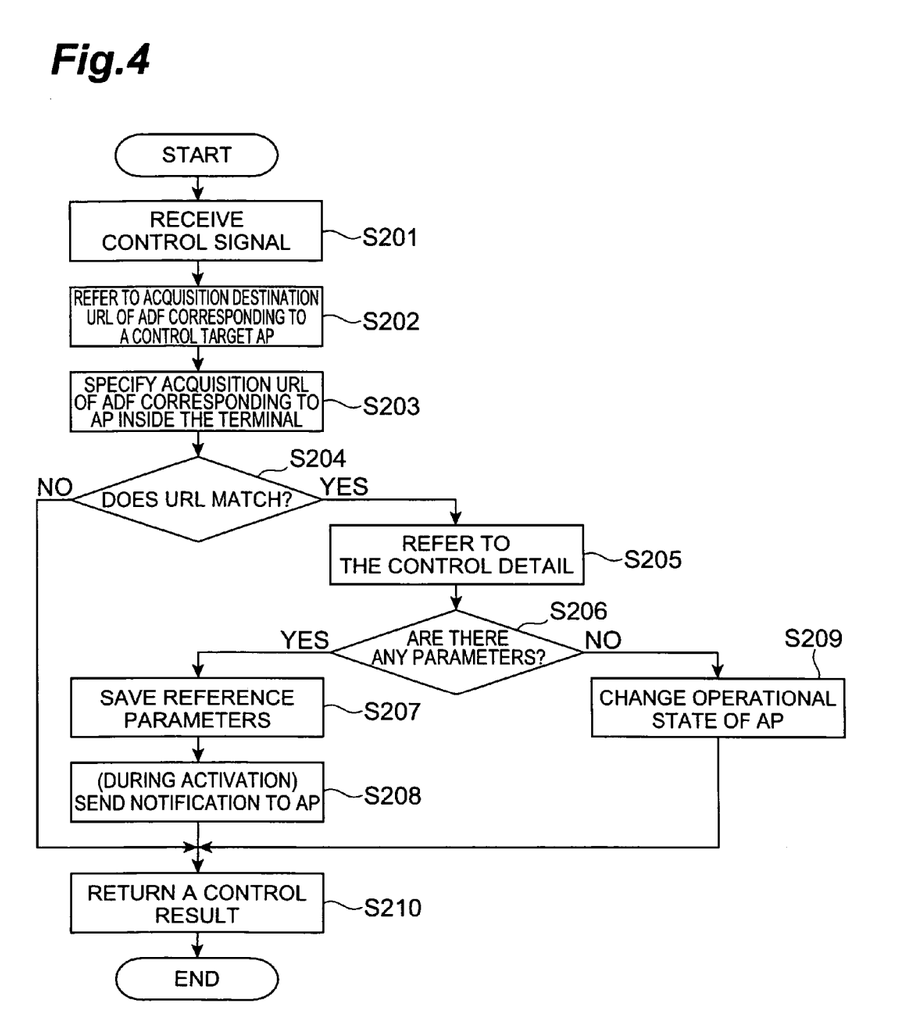
FIG. 4 is a flow chart showing operation of the mobile communication terminal at the time of controlling the application program.

Next, operation of the mobile communication terminal 1 is described, and an application control method in the mobile communication terminal 1 is explained in detail. FIG. 3 is a flow chart showing operation of the mobile communication terminal 1 at the time of downloading an application program, and FIG. 4 is a flow chart showing operation of the mobile communication terminal 1 at the time of controlling the application program.

First of all, operation of the mobile communication terminal 1 at the time of downloading an application program is now described with reference to FIG. 3.

First, the mobile communication terminal 1 accepts a download request sent by a user from a web browser or the like (step S101). In response to this request, the download portion 41 acquires an ADF file from a predetermined storage portion of the WWW server 7 (step S102). The download portion 41 then refers to the ADF file, and judges whether or not a remote control key is contained in the file (step S103). The remote control key is an item which indicates that the target application program is parameter reference type.

As a result of the above judgment, if the remote control key is not contained (step S103; NO), the download portion 41 requests the WWW server 7 for transmission of the target application program (step S109). With respect to this, a program file in which is written a program code of the application program is transmitted from the WWW server 7 to the download portion 41, and the download portion 41 stores the program file in the data storage portion 31 (step S110).

On the other hand, as result of the determination, if the remote control key is contained (step S103; YES), the download portion 41 gives an instruction for securing reference parameter region dedicated to the download target application programs 5*a*, 5*b* and 5*c* inside the data storage portion 31 (step S104). Thereafter, the download portion 41 judges whether or not this region securing processing is successful (step S105). As a result of the determination, if the region securing processing is successful (step S105; YES), the processing is shifted to a step S109, the program file is downloaded.

On the other hand, if the region securing processing fails (step S105; YES), deletion confirmation of a program file of other application program is outputted to the user (step S106). Once accepting a confirmation input for this deletion confirmation from the user, the download portion 41 deletes the program file (step S107). The download portion 41 once again gives an instruction for securing the reference parameter regions dedicated to the download target application programs 5*a*, 5*b* and 5*c* (step S108), and returns the processing to the step S105. Then, after the processings of the step S106 through S108 are repeated until the reference parameter region is secured, the download processing of the program file (steps S109 to S110) is performed.

Next, operation of the mobile communication terminal 1 at the time of controlling the application program is explained with reference to FIG. 4.

First, the control signal receiving portion 42 receives a control signal transmitted from the control server 8 (step S201). The control signal receiving portion 42 then refers to the acquisition location URL of an ADF file contained in the control signal (step S202). Further, the control signal receiving portion 42 specifies the acquisition location URLs of the ADF files corresponding to all of the application programs 5a, 5b and 5c which has been downloaded to the mobile communication terminal 1, by reading them out from the data region 3 (step S203).

Thereafter, the control signal receiving portion 42 judges whether or not the acquisition location URL of the ADF file contained in the control signal matches with any of the acquisition location URLs of the ADF files corresponding to the application programs 5a, 5b and 5c (step S204). As a result of the judgment, if the acquisition location URL of the ADF file does not match with any of them (step S204; NO), the processing is shifted to a step S210, return a control result of "failed" to the control server 8.

On the other hand, if acquisition location URL of the ADF file matches with one of them (step S204; YES), the control signal processing portion 42 refers to the data related to the detail of the control which is contained in the control signal (step S205). The control signal receiving portion 42 then judges whether or not reference parameters are contained in the detail (step S206).

If reference parameters are contained in the detail of the control (step S206; YES), the parameter saving portion 44 saves the reference parameters to the reference parameter region inside the data storage portion 31 (step S207). Thereafter, the control signal receiving portion 42 notifies the active application programs 5a, 5b and 5c, which are the target of control, of that the reference parameters are received (step S208). The reference parameters are read out from the data storage portion 31 by the application programs 5a, 5b and 5c during execution on the basis of the above notification.

On the other hand, if a reference parameters are not contained in the detail of the control (step S206; NO), the application control portion 43 causes transition of the operation state of the control target application program on the basis of the control information (step S209).

After controlling the application programs 5a, 5b and 5c in the above manner, the control signal receiving portion 42 transmits a control result of "succeeded" to the control server 8 (step S210).

Figure 5:
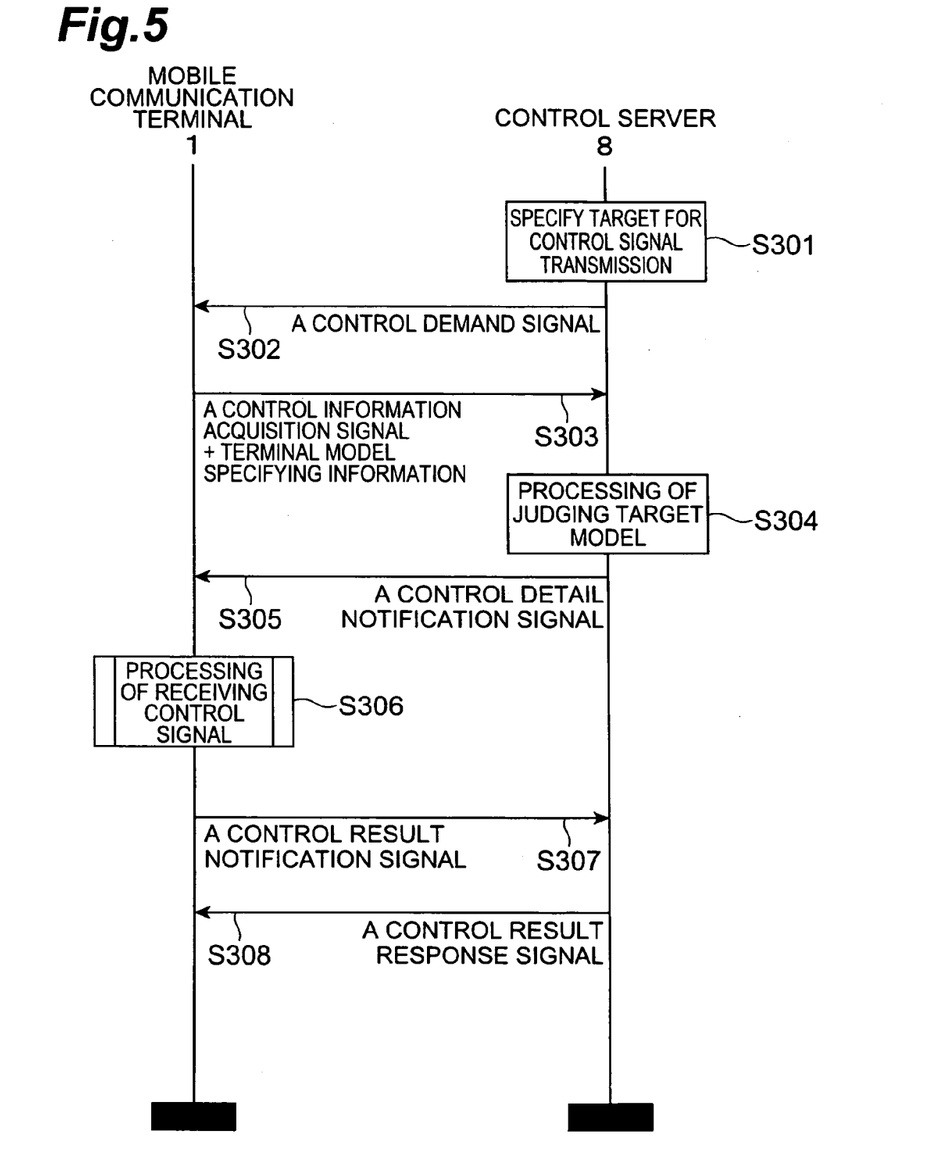
FIG. 5 is a figure showing a processing sequence of control of the application in the mobile communication terminal.

FIG. 5 shows, in detail, a processing sequence of control of the application in the mobile communication terminal. It should be noted that, in the figure, a control detail notification signal is the control signal for controlling the application programs 5a, 5b and 5c that are downloaded by the mobile communication terminal 1.

First, the mobile communication terminal 1 is specified as a control target terminal in the control server 8 (step S301). Methods for specifying include extraction of a terminal in which a specific application program is downloaded, or extraction of a terminal which belongs to a specific model of terminal. Thereafter, a control demand signal is transmitted from the control server 8 to the mobile communication terminal 1 (step S302). This control demand signal is for notifying the control target terminal of that remote control is started.

In response to this, the control signal receiving portion 42 of the mobile communication terminal 1 returns, to the control server 8, a control information acquisition signal which contains terminal model specification information for specifying the terminal model of the mobile communication terminal 1 (step S303).

Once the control server 8 receives the control information acquisition signal, the control server 8 extract information on the terminal model which is contained in the signal, and judges whether or not the mobile communication terminal 1 belongs to a control target terminal model (step S304). As a result of the judgment, if the mobile communication terminal 1 is the control target terminal model, the processing is continued, and if not, the processing is stopped.

Next, the control server 8 transmits the control detail notification signal to the mobile communication terminal 1 (step S305). This control detail notification signal contains acquisition location URLs of ADF file corresponding to the control target application programs 5a, 5b and 5c. After the mobile communication terminal 1 receives the control detail notification signal, the above-described control processings (steps S202 through S209) are performed (step S306). Then, the mobile communication terminal 1 transmits a control result notification signal to the control server 8 to notify of a control result of "succeeded/failed" (step S307). Lastly, a control result response signal is returned from the control server 8, and the processing is ended (step S308).

According to the mobile communication terminal 1 described above, after the mobile communication terminal 1 secures the data region for storing reference parameters when downloading the application programs 5a, 5b and 5c, the control signal is transmitted from the remote control server 8 to the mobile communication terminal 1, the operational states of the application programs 5a, 5b and 5c are changed to an activatable/inactivatable state or the like by the control information contained in the control signal. Furthermore, after the mobile communication terminal 1 saves the reference parameters contained in the control signal to the data storage portion 31, the application programs 5a, 5b and 5c read out the reference parameters. Accordingly, the operational sates of the application programs 5a, 5b 5c downloaded from the remote control server 8 to the mobile communication terminal 1 can be controlled, and parameters for operational control can be securely delivered to the application programs 5a, 5b and 5c at the time of the operational state control.

Hereinafter, effects which are obtained by securing the reference parameter region are explained specifically by using FIG. 6.

Figure 6:
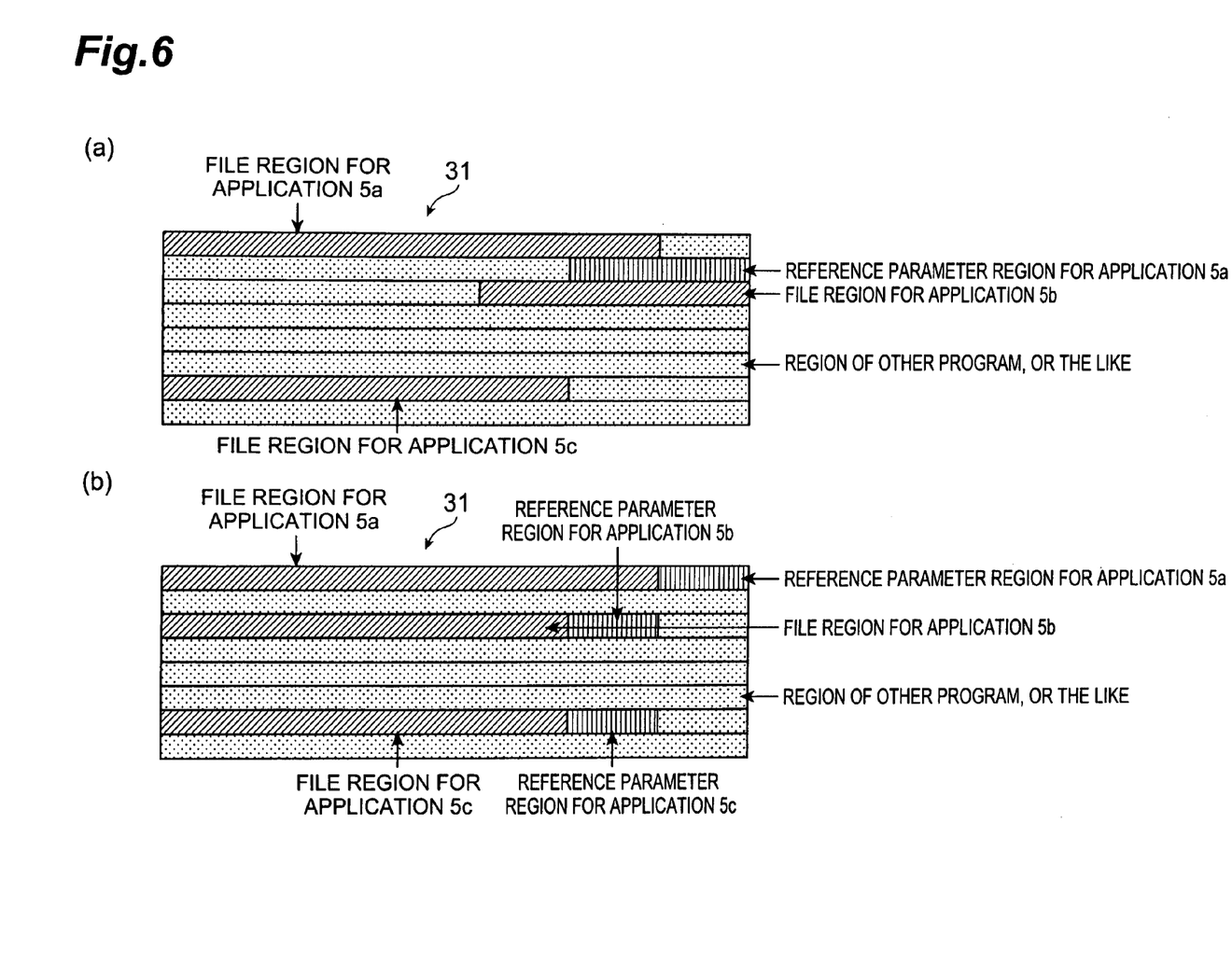
FIG. 6(a) is a figure showing imagery of a data storage portion when a reference parameter region is not secured.
FIG. 6(b) is a figure showing imagery of the data storage portion in the mobile communication terminal according to the present invention.

In FIG. 6, (a) is a figure showing imagery of the data storage portion when a reference parameter region is not secured, and (b) is a figure showing imagery of the data storage portion 31 in the mobile communication terminal according to the present invention.

The figures show examples where download is performed in the order of the application program 5a, application program 5b, and application program 5c. In the case of FIG. 6(a), the reference parameter region for the application program 5a is allocated at the time of receiving the reference parameters. At the same time, since the reference parameter region for the application program 5b or application program 5c is not allocated yet, it may not be possible to save the reference parameters for the application program 5b or 5c even if it is received.

As shown in FIG. 6(b), on the other hand, in the mobile communication terminal 1, a reference parameter region is secured in a region adjacent to a program file region of each of the application programs 5a, 5b and 5c at the time of download. Therefore, the reference parameters received from the control server 8 can be saved more securely.

Moreover, since notification of receiving a reference parameters is performed for the application programs 5a, 5b and 5c by the control signal receiving portion 42, the application programs 5a, 5b and 5c can have a configuration in which the notification of receiving the reference parameters is taken as an opportunity to read out the reference parameters. In addition, the notification of receiving the reference parameters can be received regardless of an operational mode (for example, a power saving mode or a standby mode) of the application programs, as long as the application programs are being executed. Therefore, operation of the application programs can be controlled immediately in a timely fashion for an update of the reference parameters. In addition, the program configuration of the application programs can be more simplified compared to a case in which the application programs actively reads out the parameters, because management of the previous time of receipt, reception interval and the like of the reference parameters in the application programs is no longer necessary.

It should be noted that the present invention is not limited to the above-described embodiments. For example, the application programs 5a, 5b and 5c are not limited to the programs written in a JAVA® language, thus they may be written in other language such as C language or the like.

Furthermore, the download portion 41 secures a reference parameters region when the application program to be downloaded is parameter reference type, but it may secure reference parameter regions for all the application programs to be downloaded.

Moreover, the data volume of the reference parameter region secured by the download portion 41 may vary for each application program to be downloaded.

In addition, the application management means 4 specifies the application programs by means of the acquisition location URL of the ADF file corresponding to the application programs 5, but the application management means 4 may use a value obtained by subjecting the above URL in predetermined calculation.

What is claimed is:

1. An application control method for controlling an application program inside a mobile communication terminal from a remote control device, the application control method comprising:
   securing a data region in the mobile communication terminal in which, when downloading an application program from the remote control device, the mobile communication terminal secures the data region for reference parameters to which the application program refers at the time of execution of the application program;
   securing a reference parameter region dedicated to the application program;
   judging whether or not the reference parameter region dedicated to the application program is successfully secured;
   if the reference parameter region is not successfully secured, repeating securing the reference parameter region dedicated to the application program;
   if the reference parameter region dedicated to the application program is successfully secured, downloading the application program;
   transmitting a control signal from the remote control device to the mobile communication terminal, the control signal controlling operational states of the downloaded application program, including stopping and restarting the downloaded application program, the control signal including the reference parameters to which the downloaded application program refers;
   saving the reference parameters included in the control signal to the secured data region in the mobile communication terminal; and
   the mobile communication terminal simultaneously executing the downloaded application program and referring to the saved reference parameters in the secured data region during execution as needed.

2. The application control method according to claim 1, wherein the external server is a World Wide Web server.

3. The application control method according to claim 1, wherein the application program is a program to display news.

4. A mobile communication terminal, comprising:
   downloading means for downloading an application program from an external control server and securing a data region in the mobile communication terminal for reference parameters to which the application program refers at the time of execution of the application program;
   securing means for securing a reference parameter region dedicated to the application program;
   judging means for judging whether or not the reference parameter region dedicated to the application program is successfully secured;
   if the reference parameter region is not successfully secured then repeating securing the reference parameter region dedicated to the application program;
   if the reference parameter region dedicated to the application program is successfully secured then downloading the application program;
   control signal receiving means for receiving a control signal, from the external control server, to control operational states of the downloaded application program, including stopping and restarting the downloaded application program, the control signal including the reference parameters to which the downloaded application program refers;
   parameter saving means for saving the reference parameters contained in the control signal received from the external control server to the secured data region; and
   simultaneously executing the downloaded application program and referring to the saved reference parameters in the secured data region as needed.

5. The mobile communication terminal according to claim 4, wherein the control signal receiving means notifies the application program of receiving the reference parameters.

6. The mobile communication terminal according to claim 4, wherein the external server is a World Wide Web server.

7. The mobile communication terminal according to claim 4, wherein the application program is a program that provides a game function.

* * * * *